United States Patent [19]

Helm, Jr.

[11] 4,435,374
[45] Mar. 6, 1984

[54] METHOD OF PRODUCING CARBON MONOXIDE AND HYDROGEN BY GASIFICATION OF SOLID CARBONACEOUS MATERIAL INVOLVING MICROWAVE IRRADIATION

[76] Inventor: John L. Helm, Jr., 171 E. 89th St., New York, N.Y. 10028

[21] Appl. No.: 281,846

[22] Filed: Jul. 9, 1981

[51] Int. Cl.³ .......................................... C01B 31/18
[52] U.S. Cl. ........................... 423/415 A; 423/648 R; 204/157.1 R; 252/373; 48/202; 422/186
[58] Field of Search ........................ 423/415 A, 648; 204/157.1 R; 252/373; 48/202

[56] References Cited

U.S. PATENT DOCUMENTS

| 2,093,493 | 9/1937 | Stitzer | 48/202 |
| 2,542,028 | 2/1951 | Hodge | 208/8 R |
| 4,004,896 | 1/1977 | Soo | 48/202 |
| 4,311,520 | 1/1982 | Kluesi et al. | 423/138 |

OTHER PUBLICATIONS

"Discharge Produces Hydrocarbons from Coal", Chemical and Engineering News, vol. 46, No. 4, Jan. 22, 1968, pp. 34 & 35.

Primary Examiner—Earl C. Thomas
Attorney, Agent, or Firm—Curtis, Morris & Safford

[57] ABSTRACT

A process for the gasification of carbon of solid carbonaceous material to form carbon monoxide and hydrogen by contacting the material with superheated steam and irradiating the product of said contacting with an amount of microwave energy sufficient to gasify said carbon, and apparatus therefor.

9 Claims, 5 Drawing Figures

METHOD OF PRODUCING CARBON MONOXIDE AND HYDROGEN BY GASIFICATION OF SOLID CARBONACEOUS MATERIAL INVOLVING MICROWAVE IRRADIATION

FIELD OF THE INVENTION

Reaction of a solid carbonaceous material with air, oxygen, steam, carbon dioxide, or a mixture thereof, yields a highly useful gaseous product. This invention relates to the gasification of fixed carbon in solid carbonaceous material to yield hydrogen and carbon monoxide by contacting the material with steam and irradiating the product of said contacting with an amount of microwave energy sufficient to effect said gasification of the fixed carbon by the steam.

DESCRIPTION OF THE ART

Gasification of coal involves subjecting the coal to processing conditions which are sufficiently severe to bring the coal to a state at which it can be gasified. Some prior gasification techniques can conveniently be classified as follows:

(1) Low temperature carbonization is performed at temperatures in the range of from 450° to 750° C. Mild thermal decomposition of coal occurs, yielding "semi-coke" or "char" and "low temperature tar". The char contains considerable quantities of volatiles and complex hydrocarbons. This process is also known as devolatilization.

(2) Medium temperature carbonization is performed at temperatures in the range of from 700° to 900° C. Moderate thermal decomposition of coal causes more extensive hydrocarbon breakdown, surviving compounds have simple structures.

(3) High temperature carbonization is performed at temperatures greater than or equal to 900° C. Severe thermal decomposition of coal produces complete hydrocarbon breakdown. A porous carbon skeleton called coke remains. The carbon of this skeleton under certain conditions reacts with high temperature steam to produce water gas, i.e., carbon monoxide and hydrogen; obtaining of water gas is the objective of gasification processes considered herein.

All of these techniques involve production of gas from coal. However, none of them is entirely satisfactory for production of water-gas, i.e., a mixture of hydrogen and carbon monoxide.

Several different approaches to the above-mentioned techniques have been employed. Once again, these approaches can be conveniently categorized as follows:

(1) fixed-bed gasification—lump coal is supported on a grate or by other means and exposed to a gasifying medium (the flow of gas and coal can be countercurrent or cocurrent);

(2) fluidized-bed gasification—crushed or fine coal is fluidized by contact with a gasifying medium to yield an expanded fuel bed; and (3) suspension or entrainment gasification—fine coal is suspended in a gasifying medium so that the coal particles move with the medium either linearly or in a vortex pattern.

Many prior gasification approaches are uncatalyzed and involve highly endothermic reactions. To provide the heat (additional to that imparted by the gasifying medium—typically, steam) necessary to achieve conditions sufficient for uncatalyzed gasification some of the feed coal must be combusted in the reactor; this, of course, decreases the efficiency of the gasification. Typically, the moles carbon output in usable product is of from 50 to 75% of the moles carbon input—the balance is lost as $CO_2$. Often oxygen is introduced into the gasification system in order to combust some of the feed coal, and the heat generated thereby employed in gasification.

Fixed-bed gasification may be carried out at atmospheric pressure, using air and steam as the gasifying medium and coke, anthracite coal, or non-caking or weakly caking bituminous coal as the feed. An example of this technique is operation with the Wellman-Galusha apparatus. Alternatively, oxygen and steam may be used as the gasifying medium. The gasifiers used in the foregoing operations can be divided into non-slagging and slagging units. In a non-slagging unit dry ash is removed from the gasifier; in a slagging unit molten slag is removed. Examples of non-slagging units are the Wellman-Galusha apparatus mentioned above; non-slagging operation with anthracite and coke has also been reported for a Kerpely producer and a Pintsch-Brassert generator. Typical slagging fixed-bed gasifiers which operate at atmospheric pressure and have high specific throughputs include the Thyssen-Galocsy and the Koppers gasifiers.

Fixed-bed gasification using oxygen or air with steam can also be carried out at high pressure, for example in the Lurgi gasifier.

An example of a fluidized-bed gasification is that which occurs in the Winkler gasifier.

Suspension gasification is especially attractive in that any rank of pulverized coal can be used to produce a gas with no tar. High production rates and versatile operation (either in a non-slagging or slagging mode) are afforded by use of suspension type gasifiers. However, when using a suspension gasifier one must recover the heat in the high-temperature gas and must be satisfied with a relatively low carbon conversion (85 to 90% of that with other gasification systems), due to higher carbon content of the ash. The Koppers-Trotzek gasifier operates in a non-slagging mode at atmospheric pressure with oxygen and steam as the gasifying medium. Coal, oxygen and steam are injected through opposite ends of the reaction chamber to produce a high degree of turbulent mixing. The Pandinco gasifier is another example of a unit which operates in a non-slagging mode at atmospheric pressure with oxygen and steam. The Texaco gasifier is an example of a high-pressure, slagging, suspension gasifier.

Gasification using superheated steam alone has been performed experimentally. Although such gasification proves to be possible, it is economically unsuitable due to "steam waste". The amount, and/or temperature, of steam required is not commercially feasible. That is, difficulties in obtaining and manipulating extremely superheated steam force a compromise on the extent of superheating. With a lower heat content, more steam is required for the gasification. Ultimately, an enormous excess of steam must be used. This excess escalates the product gas processing costs, as well as degrading the heat balance.

A variation of gasification using superheated steam alone is gasification with reaction heat carried by a combination of steam and recycled product gas. Thus, in the Pintsch-Hillebrand generator saturated steam is produced in a waste heat exchanger and combined with the product gas stream, the combination then being superheated to approximately 1300° C. using a generator gas-fired regenerator. The amount of steam supplied is adjusted so that there is no excess; the required additional heat is supplied by the recycled product gas. Combustion is performed, but in the regenerator rather than in the gasifier. The usefulness of this method is, in part, dependent on the gasification of a very reactive coal feed.

The heating of carbonaceous materials by applying high frequency electrostatic current is suggested in U.S. Pat. No. 2,542,028 to Hodge. This heating is effected solely by subjecting a curtain of the material to a high frequency electrostatic field, i.e., microwave irradiation. Only a relatively small amount of the carbonaceous material is converted to carbonization products; the major product is semi-coke. Subsequently, the product of irradiation is contacted with steam of a temperature low enough to cool it, with the optional further application of the high frequency electrostatic field. It is noted that it may be desirable to admit steam directly to the pyrolysis and/or carbonization of the carbonaceous material to minimize secondary cracking and side reactions.

The process and apparatus of the above-identified patent are disadvantageous because, in all their aspects, they entail the supplying of heat solely by application of the high frequency electrostatic field. Provision of superheated steam is not disclosed, and supplying of heat from steam is not contemplated. Instead, heat is generated by the reversal of dipolar molecules in the solid carbonaceous material in order to align themselves with the shifting electrostatic field. Hodge mentions operation at 350° C. (optimum) to 450° C. (maximum). And, in no event can Hodge's system operate at greater than about 480° C. because as carbonaceous materials get hotter the effectiveness of dielectric heating approaches zero at this temperature. Moreover, in order to generate significant amounts of heat a high density of carbonaceous material is necessary throughout the reactor chamber. However, since only a curtain of coal is subjected to the high frequency electrostatic field, the density of the carbonaceous material is relatively low; extreme applications of the electrostatic field are necessary to generate sufficient heat. And, proposed heat recovery in the cooling stage via endothermic steam gasification of the hot char is not effective because reaction rates are essentially zero at the low temperatures employed, and because insufficient heat is contained in the semi-coke to support the creation of energetic bonds characteristic of coal gasification products.

STATEMENT OF THE INVENTION

It is an object of this invention to provide a method and apparatus for the gasification of fixed carbon in a solid carbonaceous material to hydrogen and carbon monoxide, which method and apparatus are highly efficient in converting the carbon into such products.

It is another object of this invention to provide a method and apparatus for such gasification which take advantage of a selective enhancement of the reaction mechanism of gasification by introduction of microwave energy.

It is a further object of the invention to provide a method and apparatus for gasification of fixed carbon in a solid carbonaceous material which are conservative of the total amount of energy necessarily introduced to effect gasification.

Additional objects and advantages of the invention will be evident from the following.

An embodiment of the invention is, accordingly, a method for gasifying carbon of solid carbonaceous material to produce carbon monoxide and hydrogen, which comprises contacting the material with superheated steam of temperature of at least 650° C., and irradiating the product of said contacting with an amount of microwave energy sufficient to effect said gasification in combination with the steam.

Another embodiment of the invention is an apparatus for the gasification of carbon in solid carbonaceous material to produce carbon monoxide and hydrogen, which includes a receptacle defining an inner chamber, said receptacle being capable of withstanding temperature of at least 650° C. and adapted for holding in the chamber said solid carbonaceous material in a packed configuration; means for generating superheated steam of temperature of at least 650° C.; means for introducing the superheated steam into the chamber; and means for irradiating the contents of said receptacle with microwave energy.

It is a distinct advantage of the invention that gasification is effected by a combination of contact with sufficiently high-temperature superheated steam—which supplies heat necessary for gasification—and irradiation with microwave energy. This combination results in a synergistic decrease in the net energy expended for the gasification. Furthermore, since none of the solid carbonaceous material or product gas is employed (for example, via its combustion) in generating heat necessary to attain the conditions for gasification, the yield of gasification product per unit of solid carbonaceous material is increased.

PREFERRED EMBODIMENTS

The invention is effective in the conversion of fixed carbon in solid carbonaceous materials, for example, all varieties of coal and precursors thereof, to carbon monoxide and hydrogen. Illustratively, the application of the invention to the gasification of carbon in coal, a major fossil-fuel resource, is of particular significance.

With the invention carbon in both low-rank and high-rank coals for example, lignite, brown coal, subbituminous coal, bituminous coal and anthracite coal, may be gasified. Several characteristics of each of these coals are set forth in the following table.

|  | Low Rank–High Rank Coal | | | |
| --- | --- | --- | --- | --- |
| Typical U.S. Locations | Lignite Montana, Dakotas, Texas | Sub-Bituminous Wyoming, New Mexico | Bituminous Penn., W. Va., Ky., Kll. | Anthracite Penn., RI. |
| Approximate Analysis* | | | | |
| Volatile Matter | 26.6 | 30.2 | 35.2 | 9.3 |
| Fixed Carbon | 32.5 | 33.0 | 41.8 | 75.6 |
| Ash | 7.2 | 6.8 | 8.0 | 11.7 |
| Moisture | 33.7 | 30.0 | 15.0 | 3.4 |
| *% by wt. as mined | | | | |
| Ultimate Analysis* | | | | |
| Carbon | 70.6 | 72.7 | 77.3 | 91.7 |
| Hydrogen | 4.7 | 5.3 | 5.6 | 3.8 |
| Oxygen | 22.5 | 20.2 | 10.5 | 2.4 |
| Nitrogen | 1.2 | 1.0 | 2.0 | 1.1 |
| Sulfur | 1.0 | 0.8 | 4.6 | 1.0 |
| Heating Value | | | | |
| BTU/# | 7,070 | 7,970 | 10,700 | 13,120 |
| Caking Tendency | Non-caking | Non-caking | Mildly to highly caking | Non-caking |

*% by wt. dry, ash-free

As can be seen from the table, coals vary widely in their compositions and properties. It will be understood that a problem inherent in the characterizing of coal processing systems is that coal is one of the most varied substances in nature. It is very clear from industry practice and the literature that coal of one region can be quite different from coal of another. This variability is often more profound than usual descriptions suggest; it is not uncommon that coal from the same mine can exhibit as much variety as, or more variety than, that observed for coal from different mines. For example, it is entirely possible that coal from the first car in a coal train will be vastly different than the coal from that in the last, even though the contents of the entire train are from the same mine. As a result, absolute compositional predictability is generally not attainable, and conditions for gasification may have to be adjusted from time to time during operation (within the scope of the invention) to obtain optimum yields. Nevertheless, the invention can be used with all of these coals to obtain a satisfactory gasification product.

The desirability for gasification of an individual sample is dependent on its reactivity, moisture content, swelling and caking properties, ash content and ash properties. In general, fixed carbon content and caking tendency are the two most significant properties to consider in assessing the usefulness of a solid carbonaceous material as feed for gasification. Caking is a mechanical problem, while carbon content imposes a limit on gasification (conversion) efficiency. Caking is an especially formidable obstacle in fixed-bed gasifiers, but can be overcome by conventional techniques.

As to the above-mentioned coals, anthracite coal, which has the highest carbon content, is the most desirable feed for gasification in accordance with this invention. The next most desirable feed is bituminous coal which has a high carbon content, but also exhibits mild to considerable caking tendencies. Sub-bituminous coal and lignite coal, while attractive because they do not exhibit substantial caking tendencies, have relatively low carbon contents.

The total heat requirement for the gasification of fixed carbon to yield carbon monoxide and hydrogen in accordance with the invention (this includes heat for drying and carbonization) depends largely on the particular solid carbonaceous material employed and reaction conditions selected. It will be understood that the effects of amounts of energy respectively supplied by steam and microwave radiation are correlative. Hence, regardless of the proportion of the total heat requirement supplied by superheated steam and the proportion supplied by microwave energy, gasification will proceed as long as the total heat requirement is satisfied. However, it is generally advantageous to provide as much as possible of the stoichiometric reaction heat by means of superheated steam, and to supply activation energy of the reaction by introduction of microwave energy.

In determining the amount of heat energy which is to be supplied to satisfy the total heat requirement, it is desirable to compensate for the fact that not all of the heat energy supplied by the superheated steam and microwave radiation is used up on the actual gasification; for instance, some is lost through reactor walls and some is removed as sensible heat in the product gas itself. (The overall amount of heat energy lost can conveniently be categorized as thermal loss.) Thus, the total amount of heat supplied ($Q_{tot}$) is equivalent to the amount of heat supplied by the steam (S) and microwave radiation (M) introduced, and also equivalent to the amount of heat required for gasification in accordance with the invention ($\Delta H$) plus the amount of heat lost from the total amount of heat supplied by steam ($S \times L$ (a loss factor)) plus the heat lost from the total amount of heat supplied by microwave radiation ($M \times L$ (the loss factor)). A linear relationship exists, as follows:

$$S = (1+L)H - M,$$

the variables having the definition assigned them above.

Of course, since steam is a chemical reactant as well as a vehicle for supplying of energy, it is preferred to supply at least the stoichiometric amount of steam ($H_2O$) necessary for reaction with the amount of fixed carbon to be gasified. If the solid carbonaceous material to be gasified is typical bituminous coal and the superheated steam is at 1800° F. (approximately 982° C.) at one (1) atmosphere, the following can be assumed:

heat of high temperature carbonization:
 1080–1200 Btu/lb. coal coke yield for high temperature carbonization:
    0.65 per lb. feed (8% ash)
heat of combustion (carbon monoxide):
    67.6361 Kcal/g. mole
heat of combustion (molecular hydrogen):
    68.3174 Kcal/g. mole
heat of gasification:
    32,000 Btu/g. mole at 1800° F. (approximately 982° C.) or 1620 cal/g. carbon, or 2918.57 Btu/lb. carbon.

Thus, the required number of moles of steam ($H_2O$) for chemical reaction with one pound of the above-mentioned coal is:

$(0.6 \times 454)/12 = 22.7$ g. moles $H_2O = 0.9$ lb. $H_2O$

This value is designated $S_o$. For $S \geq S_o$, $S = (1+L)\Delta H - M$; for $S < S_o$, at least $S_o$ must be provided.

Figure 1:
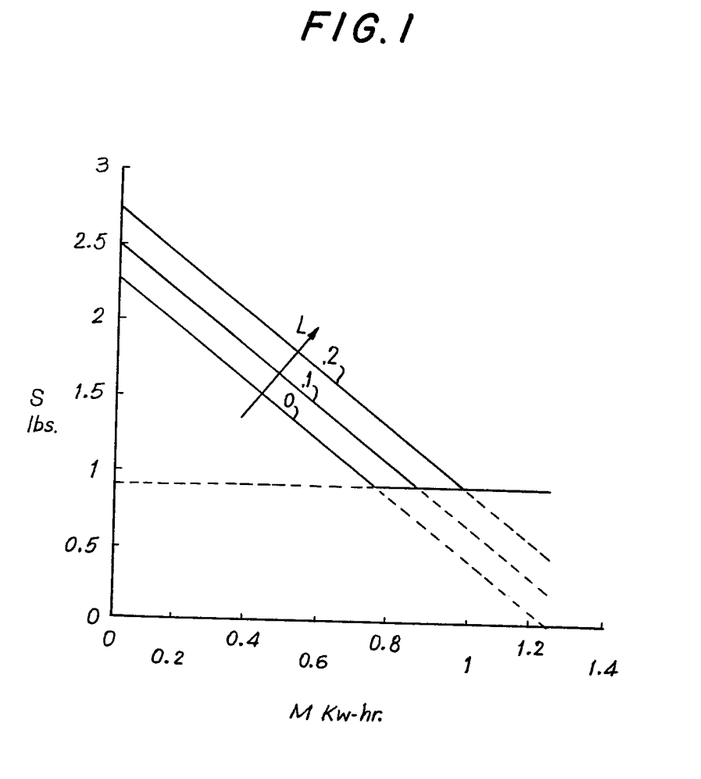
FIG. 1 is a plot of the amount of steam v. the amount of microwave energy deposited to gasify a pound of coal under given conditions.

Given 1 pound of coal and superheated steam at 1800° F. and 1 atmosphere the relationship between total steam-heat energy and total microwave energy to be introduced to effect gasification of fixed carbon in the coal can be plotted for various loss factors, such as 0, 0.1 and 0.2, and a stoichiometric threshold of 0.9 pounds steam. This plot is illustrated in FIG. 1, wherein the abscissa indicates the equivalent electrical power (measured in kilowatt-hours) of the amount of the microwave energy introduced, the ordinate indicates the pounds of steam required, and L indicates loss factor. A horizontal dashed line demarcates the stoichiometric value 0.9 pounds of steam; the line becomes solid where the minimum required amount of steam to impart heat drops under that necessary for chemical reaction. Below that, dotted lines illustrate an extrapolation of the amount of steam necessary for provision of heat energy.

It will be understood that the suitability of a particular combination of steam-energy and microwave-energy amounts for gasification in accordance with the present invention depends largely on the highly variable nature of the solid carbonaceous material, reaction conditions, etc. Furthermore, local variations in the solid carbonaceous material employed, variability in microwave generating apparatus (for instance in conversion efficiency) and the like make theoretical predictability unattainable in many situations. However, once in possession of the invention as described herein, those of ordinary skill in the art will find it within the routine skill to determine not only suitable combinations of steam-energy and microwave-energy amounts but combinations which will provide optimum performance for the particular systems they select.

Figure 2:
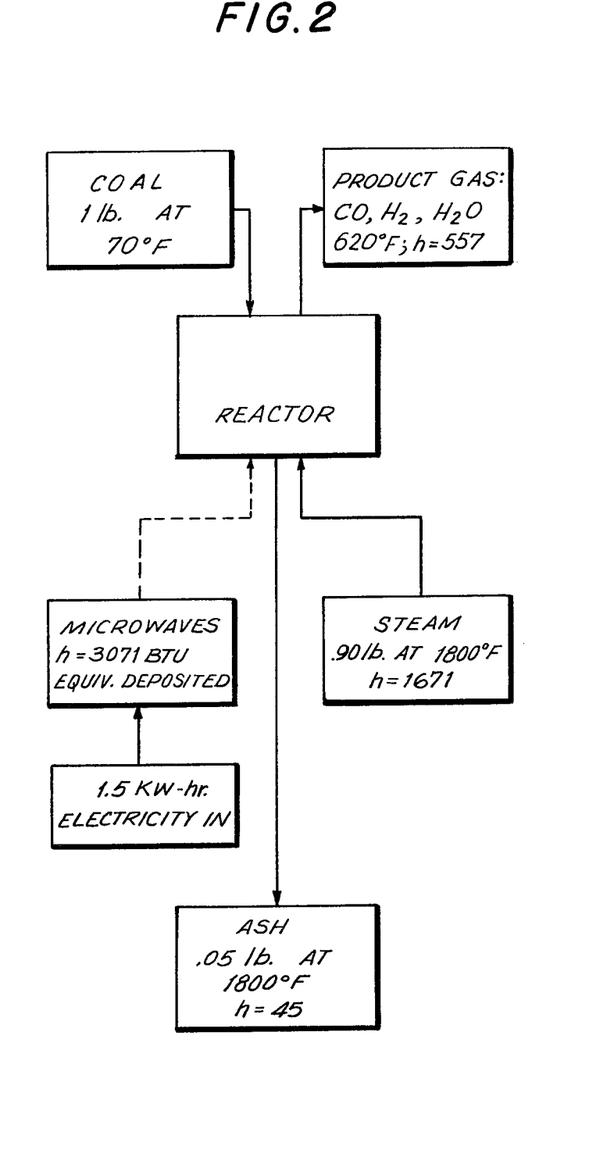
FIG. 2 is a flow chart illustrating a material and energy balance for an embodiment of the invention.

For purposes of further guidance, a hypothetical example of operation with the present invention follows, based on plausible estimates for the steam and electrical inputs (definitions of variables, if not set forth, are as given previously):

$\Delta H = 4185$ BTU/lb. coal feed
$E_a = 3003$ BTU/lb. feed (activation energy-assumes no catalytic effects)
$M = 0.90$ Kw-hr/lb. feed (also equals 3071.7 BTU, roughly $E_a$)
$L = 0.10$ (10% heat waste)
Magnetron Efficiency = 60%
Steam Pressure = 1.0 Atm.
Steam Temperature = 1800° F. (982° C.)
Steam Enthalpy = 1857.3 BTU/lb. Steam Steam Input $S = (1+L)\Delta H - M$
$S = (1+0.1) 4185 - 3071$
$S = 1532.5$ BTU Required
$S = 1532.5/1857$
$S = 0.83$ (<0.90)
$S = 0.90$ lb. Steam/lb. Coal Feed Electrical Input $P = M/\text{eff}$
$P = 0.90$ Kw-hr/0.60
$P = 1.50$ Kw-hr/lb. Coal Feed In this example the amount of steam needed to carry the 1532.5 BTU is less than the stoichiometric threshold for the sample coal. As a result the threshold value of 0.90 lb. is required. The excess heat contained in the extra steam is about 139 BTU. FIG. 2 displays the approximate material and energy balance for this example; "h" is the amount of heat energy expressed in BTU's. This heat balance assumes an adiabatic reactor; loss effects elevate the outlet gas temperature rather than distributing themselves over the reactor and this greatly simplifies the calculations.

Repetition of this calculation while assuming catalytic assistance such that the effects of the microwave input reduce $E_a$ by a factor of two yields: $S = 1.65$ lb. Steam/lb. Coal Feed, and $M = 0.75$ Kw-hr/lb. Coal Feed. Since only 0.90 lb. steam is required by the chemistry, there is a steam excess, the excess being $1.65 - 0.90 = 0.75$ lb. With the elimination of excess heat and the addition of extra steam in the product gas, the heat balance indicates an outlet gas temperature of about 400° F. (205° C.) and a steam excess level of 0.79 lb.

As is evident from the foregoing discussion superheated steam is employed in the invention as a heat-transport fluid to supply energy to the solid carbonaceous material for gasification. The steam is suitably generated by any conventional means, such as a heat exchanger, capable of heating the steam to temperature of at least 650° C.

In a particularly advantageous embodiment, the invention involves employing superheated steam of appropriate temperature generated in connection with, for instance, heat removal operations in an HTGR nuclear power plant. Such steam is produced in abundant quantities and is generally of an advantageously high temperature, on the order of, say, 1205° C.

A preferred minimum steam temperature is 700° C., with a preferred maximum being 5000° C., and a more preferred maximum being 1370° C. A more preferred minimum steam temperature is 815° C. and a still more preferred maximum steam temperature 1260° C., especially 930° C. While steam properties suitable for practicing of this invention are highly variable, in most embodiments operation with steam of the highest feasible temperature at atmospheric or low pressure is advantageous.

Since the temperature maintained during irradiation is effectively determined by the temperature of the steam in the vicinity of the irradiation, the irradiation temperature is generally correspondent to the temperature of the steam supplied.

Except under virtually ideal conditions, it is generally advantageous to supply an amount of steam in excess of the minimum necessary for gasification, i.e., the stoichiometric amount with reference to the amount of fixed carbon in the coal (as discussed previously). The amount of steam employed is determined mainly by the percent of fixed carbon available for gasification (to water gas) in the solid carbonaceous material (i.e., the greater the amount of fixed carbon), the greater the amount of steam); by the moisture content of such material (i.e., on the amount of heat necessary to drive off this moisture); on the content of volatiles in the material (i.e., the higher the volatile content, the greater the amount of carbonization heat required); and on the temperature at which such gasification is to be run.

In a preferred embodiment, two to two and one-half times such stoichiometric amount of steam are employed.

Gasification to water gas in accordance with the invention may be performed at pressures from atmospheric to moderate, up to say about 10 atmospheres. It is preferred to operate at a relatively low pressure, on the order of ambient atmospheric pressure.

Contacting the solid carbonaceous material with superheated steam in accordance with the invention involves exposing the material to the steam to an extent sufficient to impart sensible heat of the steam to the material in aid of gasification. In an especially preferred embodiment the super-heated steam and product gases are flowed countercurrently to solid carbonaceous material to maximize the efficiency of heat use and recovery.

Illustratively, moist raw coal enters a large volume of feed moving countercurrently to the product gases and excess steam. By virtue of this arrangement, heat exchange is taking place to recover most of the sensible heat in the existing gas. Any microwaves that may have penetrated this far are absorbed by the coal and converted to heat. At this stage the moisture is driven out of the coal. Progressing down the bed, exposure to increasingly hotter gas elevates the coal to the threshold of low temperature carbonization, and distillates are released. Depending on the details of the thermal gradient, medium and high temperature carbonization soon follow. The newly formed coke is warmed further as it enters a zone where it is exposed to high temperature steam and full power microwaves and the coke reacts with steam to form carbon monoxide and hydrogen to complete the gasification method. Depending on the particular retort design, ash is removed and the bed advances to bring more fresh coke into the gasification zone. As mentioned above, gaseous products are forced up the bed for recovery of their sensible heat.

Operation with the invention in a countercurrent flow mode such as described above, is especially advantageous in that a "self-cleaning" action is exhibited. That is to say, even if as solid carbonaceous material progresses along the gasification path a plug forms due to swelling and caking, the material on the steam-side of the plug will still be gasified as described as long as the plug is not airtight so as not to prevent escape of product gases. After the material under the plug is substantially consumed, the plug itself is exposed to the full force of microwave/steam input. In general, carbon in the plug is gasified due to the high energy of the now undiluted steam and microwaves, especially since the steam is increasingly corrosive due to the high velocity of flow developed in the cracks and openings of the plug. Once gasification begins, the structural integrity of the plug deteriorates; in many instances, the pressure exerted by the feed on the nonsteamside hastens collapse of the plug. Thus, the obstruction is cleared.

It will, of course, be understood that superheated steam and product gases are suitably contacted with solid carbonaceous materials in flow relationships other than countercurrent, for instance, cocurrent and crosscurrent; in such instances heat recovery efficiency may be more difficult and depends on specific design of the gasification system. Interestingly, in some embodiments countercurrent bed systems, such as the Lurgi system, are adaptable for employment in the present invention. However, entrained gasification systems and fluidized bed systems are generally not suitable since the density of reacting coal is too low for efficient microwave usage, and design difficulties of this nature should be kept in mind in selecting flow relationships for gasification in accordance with the invention.

In any event, the interaction of the steam and solid carbonaceous material via their contacting provides an environment in which irradiation of the product of the solid carbonaceous material/steam contacting selectively enhances the ultimate conversion to a gasification product.

The irradiation of the product of the solid carbonaceous material/steam contacting with microwave energy involves subjecting the product to an amount of microwave energy sufficient to effect gasification (to produce water gas) by the energy supplied from the steam. It is important to recognize that the overall amount of energy introduced is decreased because the microwave energy is not introduced for the purpose of supplying the bulk heat energy necessary to cause gasification, but instead to lower the gasification energy barrier of a system already partially excited to the gasification state by steam heat. The introduction of microwave energy in accordance with the present invention selectively enhances the production of the gasification product, i.e., carbon monoxide (C=O) and hydrogen. Therefore, significant energy savings are attainable with gasification in accordance with the invention.

While not wishing to be bound by the following hypothesis, one possible explanation of the operation of the invention is that the interaction of the solid carbonaceous material and steam results in an activated complex which resembles an amorphous cluster of nuclei surrounded by a cloud of electrons. This system is constantly in motion and therefore is constantly changing shape. The range of shapes is considerable inasmuch as the electron cloud is highly elastic by virtue of extensive resonance stabilization which is typical of aromatic structures found, for example, in coal. Since the water supplies oxygen to the activated complex, the complex sometimes takes a form resembling a C=O structure, which is polar in nature. When the complex is subjected to microwave energy, this energy acts quasi-catalytically to preserve selectively the C=O structure when that structure forms in the activated complex resulting from the solid carbonaceous material/steam contacting. The fundamental gasification reaction, stoichiometrically written, is:

$$C + H_2O \rightleftharpoons CO + H_2.$$

The C=O structure is polar in nature. It follows that disturbances in its electromagnetic environment can exert an accelerating influence on the release of C=O. Introduction of microwave energy is such an electromagnetic disturbance. When part of the activated complex assumes the polar C=O structure, this structure aligns itself with the microwave field and is selectively torn out of the activated complex. The microwave energy field does not act to enhance the release of nonpolar products and, therefore, does not interact with the complex when none of it assumes this polar structure. In contrast, without the aid of microwave irradiation the C=O structure in the activated complex must be sufficiently excited by solely thermal means to overcome any resistance to its release. The net result of microwave irradiation is that the energy of excitement necessary for release of the C=O from the activated complex (i.e., the activation energy) is reduced and, therefore, a quasi-catalytic effect occurs.

As indicated previously, the amount of microwave energy deposited is correlative with the amount of steam heat energy deposited, and therefore depends largely on the amount of superheated steam supplied. Nevertheless, there are other factors which influence the amount of microwave energy to be deposited. Thus, with reference to the amount of feed solid carbonaceous material, for example coal, the amount of microwave energy necessary will vary on a per pound of coal basis in proportion to the percent fixed carbon of the particular coal. It may also vary by virtue of the described surrogate catalytic effects.

Irradiation of the entire amount of solid carbonaceous material provided for gasification, and therefore the entire product of the solid carbonaceous material/steam contacting, is suitable for the practicing of the invention. However, it is also suitable to irradiate only a portion of the configuration of solid carbonaceous material, and hence only a portion of the product of such contacting, thereby more easily controlling the overall expenditure of microwave energy. Inasmuch as the loss of heat from the steam is roughly proportional to the amount of solid carbonaceous material contacted (until the heat content of the steam is exhausted), it is advantageous to irradiate a portion of the solid carbonaceous material configuration (for example bed) proximate a location of introduction of steam into the configuration.

Additionally, although a continuous irradiation is suitable for some embodiments of the invention, further efficiency of microwave utilization is obtainable by pulsing the microwave energy in its delivery to the product of the solid carbonaceous material/steam contacting. Continuous high power irradiation is more expensive than pulsed irradiation because pulsing affords the obtaining of a very powerful microwave energy input along with the achievement of a low average power consumption. With the foregoing embodiments microwave energy is introduced into the system only when and where it will enhance the conditions necessary for gasification, thereby resulting in improvement of the efficiency of the gasification.

A typical pulsing frequency is 60 pulses/second; however, one skilled in the art will appreciate that a wide range of pulsing frequencies is suitable for the claimed invention. The choice of a particular one will be dependent on which yields optimum results with the solid carbonaceous material (for example, coal) at hand.

And, in this connection, load impedance matching is a factor also advantageously considered. That is to say, it is desirable to optimize the transfer of microwave energy from its source to a destination or "load" (solid carbonaceous material). To minimize losses, a good "match", i.e., compatibility, of the load with the microwave energy output is effected. A measure of compatibility, derived from impedance, is called the impedance match. Thus, microwave energy output is matched to the load impedance so the effective microwave power is completely given up to the load.

If a favorable impedance match is not achieved, the load reflects a portion of the input wave and a standing wave, which interferes with further microwave irradiation, is established. The ratio of the maximum to minimum potential in this standing electric field is called the Voltage Standing Wave Ratio, or VSWR. The reciprocal for the VSWR is called the matching factor. The VSWR provides an indication of a limit on how efficiently the source can push energy through the gasification system.

As a result of the supplying of the energy for gasification entirely by steam and microwave irradiation, it is not necessary to combust some of the feed carbonaceous material, for example, by supplying oxygen thereto and oxidizing it, or to recycle product gas to obtain the additional heat required for gasification. The advantage of conserving product gas is self-evident. Elimination of the need for combusting feed material confers the capability of producing a greater amount of product per unit of feed material (or per unit of reactor volume); also, it allows elimination of oxygen-introduction. The advantage of the latter can be better appreciated when it is noted that in some systems relatively pure oxygen, an expensive item, is preferred for optimum operation. See, for example, *Reigel's Handbook of Industrial Chemistry*, 7th edition, edited by James A. Kant, p. 50 (1974). In accordance with a preferred embodiment of the invention, gasification is effected without introducing oxygen. In a further preferred embodiment of the invention, the gasification of the solid carbonaceous material, for example, coal, is effected in the absence of heat generated by the oxidation of the material.

It is particularly convenient and advantageous if the solid carbonaceous material is packed so as to form what is, in effect, a fixed bed containing interstices. In such an embodiment, the superheated steam supplying heat in aid of the gasification is infiltrated through the interstices in the packed material, thereby promoting enhanced contact between the solid carbonaceous material and the steam. This arrangement affords more efficient use of the heat energy supplied by the steam as the transfer of this energy from the steam to the material is maximized. Steam is not wasted by a failure to attain its contacting with the solid carbonaceous material. Less steam is necessary to obtain the same amount of heating of the material than if the material were spread out. Also, by offering a compact, well-defined target this embodiment tends to make more efficient use of reactor space and eliminates the wastage of microwave energy failing to irradiate the product of the solid carbonaceous material/steam contacting.

As will be appreciated, in many instances it may be advantageous to replenish the solid carbonaceous material as it is consumed to bring about the processing economies associated with continuous or continual operation of the gasification.

Apparatus suitable for the practicing of the foregoing process is also an aspect of the claimed invention. Such apparatus includes a receptacle defining a chamber within, the receptacle being capable of withstanding temperature of at least 650° C. and adapted for holding in the chamber solid carbonaceous material in a packed configuration. The receptacle is suitably of virtually any convenient shape, for example, substantially cylindrical. The receptacle is advantageously substantially fluid-tight and microwave-tight to preserve the integrity of the contents of the chamber defined within. The chamber occupied by the solid carbonaceous material may be of virtually any shape as long as it allows the packing of the solid carbonaceous material therein preferably in such a manner as to create and maintain interstices in the packed material for steam-infiltration.

In some embodiments of the invention, at least a portion of the receptacle is transparent to microwave energy, and in other embodiments all of the receptacle is. Alternatively, the entire receptacle is made of material which is not tansparent to microwave energy. In such case, if the microwave generator is outside the receptacle, the receptacle wall or walls are penetrated by waveguides which in essence are conduits opaque to microwave energy through which microwave energy generated outside the receptacle is transported to the chamber inside, as further described below.

It will be appreciated that, even if transparent, receptacle material must also be capable of withstanding the rigorous conditions necessary to effect gasification. Examples of suitable transparent materials are, for the most part, ceramic dielectrics. These substances are complex $TiO_x$ and $SiO_x$ structures. Examples of such materials are glass, quartz, fire clay and mineral refractories. Transite, a mixture of cement and asbestos, is also useful in some embodiments of the invention. However, composite materials like Transite will probably have too high a moisture content for many other embodiments. Additionally, coal ash itself, may be useful in various embodiments.

In embodiments in which only a portion, or none of the receptacle is transparent to microwave energy, materials which, although not transparent to microwave energy, are particularly adapted for resistance to the conditions attendant to gasification are suitably employed. Virtually any high temperature steel or alloy is suitable, with the proviso that materials susceptible to hydrogen embrittlement should be avoided. Examples of acceptable metals are cast iron, mild steels, carbon steels, stainless steels and NiCrFe alloys.

As previously noted, steam suitable for the practicing of the invention is generally superheated, and in any event, is acceptably generated by any conventional means capable of providing steam of an appropriately high temperature. Preferred means are those which generate steam of preferred temperature, as previously set forth. The steam is delivered to the chamber for contact with the solid carbonaceous material by conventional means also. For example, a conduit communicating at one end with the steam generator and at the other with the chamber may be provided.

In various embodiments of this invention, the means for irradiating with microwave energy suitably comprises a microwave energy source capable of supplying large amounts of high power irradiation. While a wide variety of devices exist and the choice of device largely depends on the application under consideration, the selection of suitable generators is somewhat reduced due to the need for substantial amounts of relatively high power irradiation. Typical sources are density modulated tube generators and velocity modulated tube generators. (It will be recognized by those skilled in the art that capacitive generators like the retort of Hodge in U.S. Pat. No. 2,542,028 are inefficient and quite limited to frequencies below 100 Mhz.) Density modulated tubes are vacuum tubes similar in construction to conventional triode and tetrode tubes. Such tubes are used extensively in telecommunication, but due to the fact that tube output falls with increasing working frequency high power tubes operating at high frequency are expensive and probably not as suitable as velocity modulated devices. Velocity modulated tube generators, more commonly known as klystrons, travelling-wave tubes, and magnetrons, differ from other tube devices in that they manipulate electron beams indirectly via field interactions rather than by charge variations across a grid.

The continuous-wave magnetron is advantageous over other microwave generators by virtue of its simplicity, low cost, high efficiency, versatility in terms of power requirements, and forgiveness of poor load behavior. As a result, in a preferred embodiment of the present invention, microwaves are generated by one or more continuous-wave magnetrons. The microwave energy produced by the source is suitably directed through a transparent portion of the receptacle to a chamber inside the receptacle, to irradiate the contents thereof. Or, in an alternative embodiment, the microwave energy is conducted into this chamber through reflective receptacle walls via an above-mentioned wave-guide (or plurality thereof), i.e., a conduit made of a material which is a good conductor of electricity and does not melt at high temperature. Generally, reflective materials are useful for constructing a waveguide.

In embodiments in which at least part of the receptacle is transparent to microwave energy, the means for irradiating the contents of the receptacle is advantageously positioned adjacent a transparent portion of the receptacle. And, in a preferred embodiment, a ring of magnetrons is disposed about the periphery of the receptacle adjacent a transparent portion thereof. Alternatively, for instance, if microwave energy is conducted inside the wall or walls of the receptacle via one or more waveguides, the means for irradiating typically includes both apparatus for generating such energy and apparatus for emitting same for contact with contents of the chamber; thus, the means for irradiating suitably includes one or more radiators or antennae connected to the waveguide. Depending on the disposition of the means for irradiating and/or the amount of the receptacle which is transparent to microwave energy, varying amounts of the contents of the receptacle (up to and including all) may be irradiated. In a preferred embodiment of the invention, the means for irradiating is adpated to irradiate only a portion of the contents of the receptacle, advantageously proximate a location of introduction of steam into the chamber.

For the reasons previously set forth, it is advantageous to irradiate with pulsed microwave energy. Therefore, in an embodiment of the invention, the means for irradiating is adapted to supply pulsed microwave energy. This can be accomplished, for example, by periodically varying the electrical power supplied to a microwave source, such as a magnetron. Thus, an apparatus including one or more pulsed magnetrons is especially preferred.

The apparatus in accordance with the claimed invention also advantageously includes means for removing from the chamber within the receptacle the product of the gasification, a gas. Any conventional means for removing gas from a chamber is acceptable. A suitable means is, for example, a conduit communicating with the chamber in which the gasification occurs, said conduit optionally extending into the chamber, and the conduit being disposed in reference to the chamber so as to receive the gaseous product of the gasification. One or a plurality of compressors are suitably operatively associated with the conduit so as to assist in the withdrawal of the gaseous product. The conduit, for example, suitably leads to a storage vessel or apparatus for synthesizing a higher product from the gasification product.

The apparatus of the invention typically also includes, or is employed in cooperation with, means for introducing solid carbonaceous material into the chamber within the receptacle. This affords a capability of replenishing the supply of material within the receptacle, for example, during gasification. This means typically is a hopper for storage of the solid carbonaceous material and a conduit communicating at one end with the hopper and at the other end with the chamber, said conduit being closable so as to prevent flow of solid carbonaceous material from the hopper into the chamber at the discretion of the operator. The hopper may, in turn, be supplied by a conveyor belt appropriately disposed so as to bring solid carbonaceous material to the hopper and deposit it therein. This arrangement makes available the previously mentioned processing economies associated with continuous or continual operation.

Figure 3:
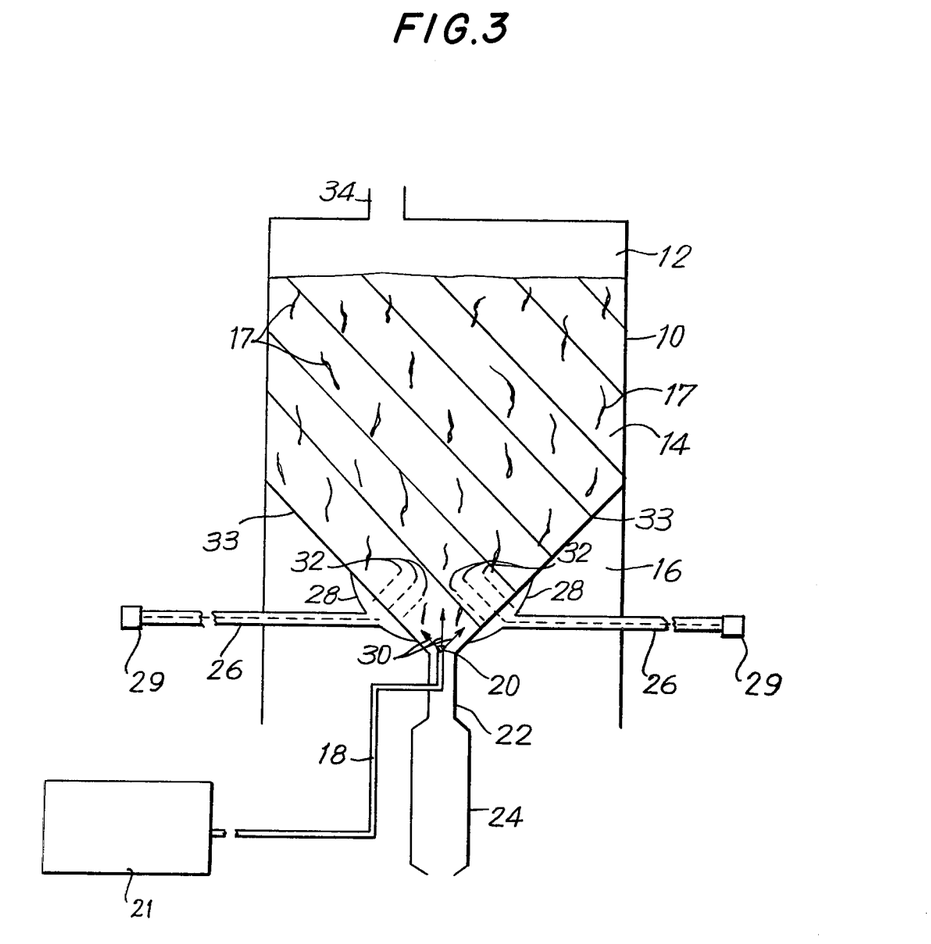
FIG. 3 is a view of a conical bed gasification apparatus suitable for practicing the present invention.
Figure 4:
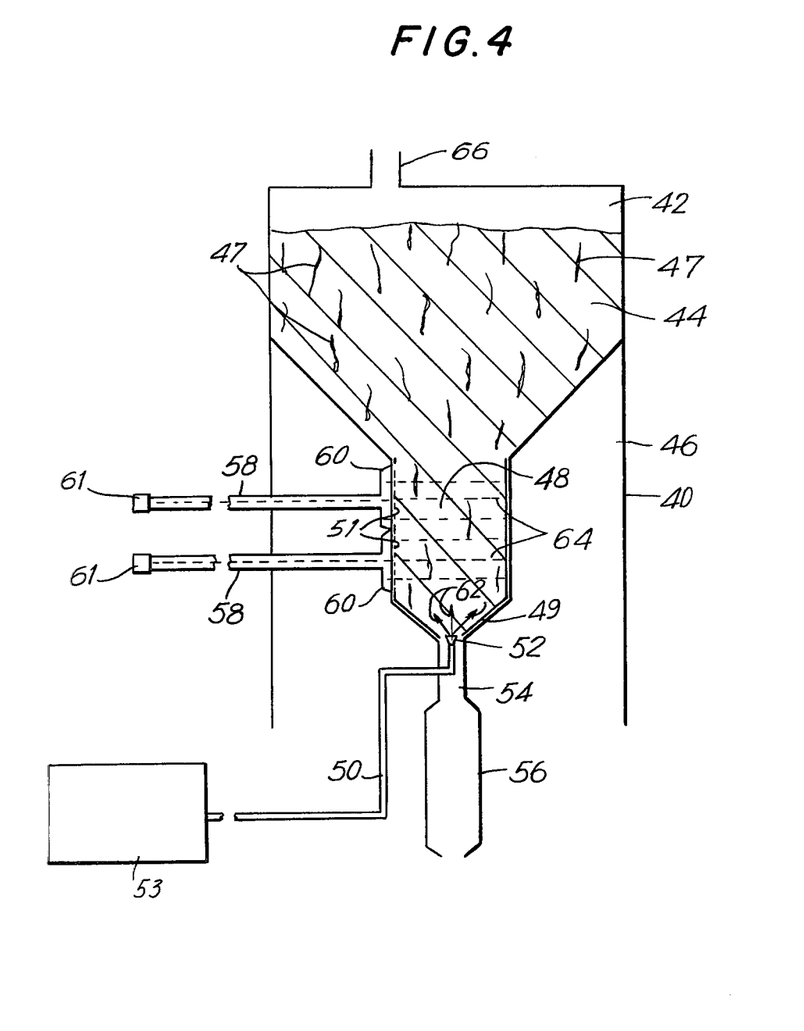
FIG. 4 is a view of a resonant cavity bed gasification apparatus suitable for practicing the invention.
Figure 5:
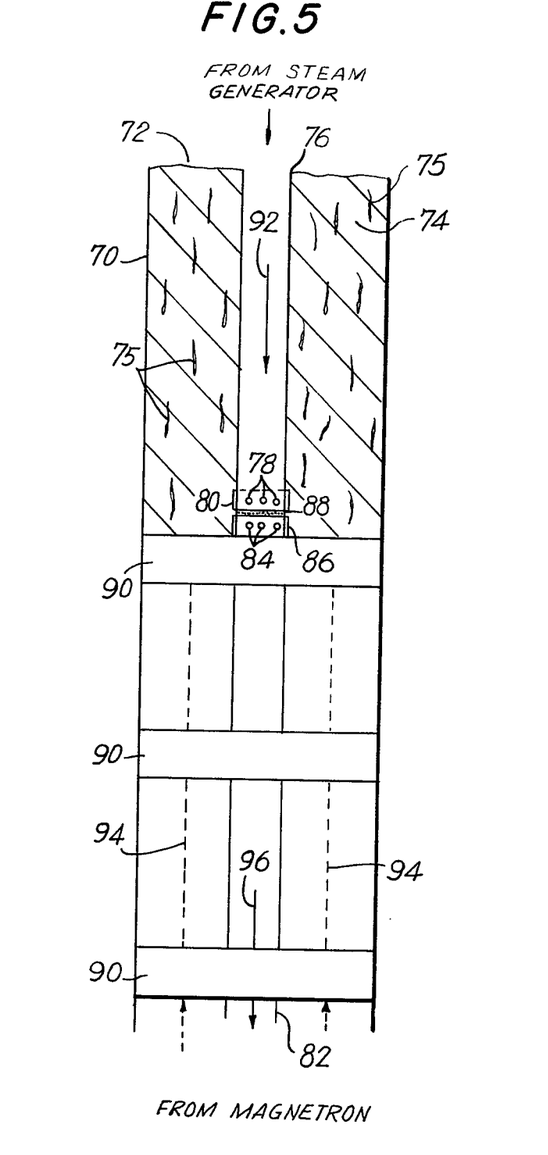
FIG. 5 is a view of a waveguide gasification apparatus suitable for practicing the invention.

A better understanding of the instant invention may be achieved with reference to accompanying FIGS. 3, 4 and 5.

In FIG. 3 there is shown apparatus suitable for practicing the present invention. A cylindrical reactor vessel 10, made of a material not transparent to microwave energy, in this case carbon steel, contains at its lower end a ceramic plug 16; here the ceramic material is of a silicon oxide-type. Alternatively, the plug is suitably made of an ash composition which typically contains aluminum oxides; silicon oxides; calcium, iron, and magnesium carbonates; aluminum-silicon-oxide complexes; and, to a lesser extent, some other inorganic ionic salts; all of these have very good dielectric properties similar to those of ceramics. The ceramic plug 16 is positioned within the reactor vessel to define, in cooperation with the inner surface of the vessel, a chamber 12, the lower portion of which is an inverted cone. A bed of pieces of bituminous coal 14 occupies the chamber 12 and is supported by plug 16. It will be understood that alternate means for supporting the coal, such as a grate (not shown here for purposes of simplicity and clarity), typically attached to the inner surface of the receptacle and positioned across the chamber defined by the inner walls of the reactor vessel, are suitable.

The coal is in a packed configuration, i.e., the pieces are packed rather tightly within the chamber; but, there are interstices 17 within the coal bed. Conduit 18 is embedded within plug 16 and is connected to nozzles 20 thereby providing a path for flow of steam to these nozzles from steam generator 21. The nozzles are mounted at the apex of conically shaped portion of chamber 12, slightly above the mouth of conduit 22 which communicates with chamber 12. Also embedded within plug 16 are microwave radiators 28 (alternatively, antennae are suitably employed; these are not shown, again for purposes of simplicity and clarity). The orientation of radiators 28 is such that microwave radiation 32 is projected into the coal bed 14. In this embodiment the faces of the radiators are flush with the sloping upper surfaces 33 of ceramic plug 16. Microwave radiation is supplied to radiators 28 through waveguides 26 which are also implanted within ceramic plug 16 and extend outwardly beyond the walls of reactor 10 to microwave energy sources such as magnetrons 29, which are timed to activate alternately. In this embodiment the waveguides are coaxial and are two-inch diameter tubes constructed from carbon steel which is impervious to microwave energy. In general, the diameter of the waveguide must be large enough so that a fundamental wave can be established and transmitted, but not so big that harmonics of that fundamental wave are permitted to form. A diameter of from two to three inches is frequently suitable.

In operation, steam 30 issues from nozzles 20 and countercurrently contacts coal of bed 14 as the steam infiltrates generally upwardly through interstices in the coal bed. The steam 30 is superheated and of a temperature of about 1316° C. (2400° F.). Sensible heat is imparted by the steam to the coal in aid of a reaction of carbon in the coal with the steam to produce water gas, that is, carbon monoxide and hydrogen. Pulsed microwave radiation 32 is alternately emitted by one and then the other of radiators 28 and contacts the product of the contacting of superheated steam and coal. (In another embodiment, the radiators are not pulsed, but instead both continuously emit radiation; however, to obtain optimal results when two or more radiators are active simultaneously, their energy fields must be in phase so that interaction is largely constructive). Irradiation with microwave energy is sufficient to effect conversion of the fixed carbon in the coal to water gas.

The gaseous product rises through the coal bed and is taken off at conduit 34, if desired with the aid of a compressor or the like (not shown for purposes of simplicity and clarity). Residual ash left over from the reaction of carbon in the coal with the steam, is removed from the reaction chamber 12 via conduit 22, through which the ash travels to ash lock 24 for disposal.

Illustrated in FIG. 4 is an alternative apparatus suitable for practicing the present invention. A cylindrical reactor vessel 40, made of cast iron (again, a material not transparent to microwave energy) contains at its lower end a ceramic plug 46 of titanium oxide-type material. The ceramic plug is positioned within the reactor vessel to bound in cooperation with the inner surface of the vessel, an obtuse, generally conical chamber 42. However, at its lower end, the chamber (in the vicinity of where the apex would be) includes a cavity 48 bound by the plug 46, so that the chamber has two portions. The reactor vessel also contains means for defining a microwave resonant zone. Here, the cavity (as is typical) is lined with a metal layer 49, in this instance carbon steel, which is microwave-reflective to promote resonance of microwave energy and facilitate setting up of a standing wave. Thus, the microwave resonant zone and the lower portion (cavity 48) of the chamber are coextensive. A bed of bituminous coal 44 occupies the chamber 42, cavity 48 included, and is supported by plug 46. The coal is in a packed configuration, that is, packed rather tightly within the chamber, including the cavity, although there are interstices 47 throughout the coal bed. Conduit 50 is embedded within plug 46 and is connected to nozzles 52 to provide a path for supplying of steam to the nozzles from steam generator 53. The nozzles are mounted at the lower end of the cavity 48 slightly above the mouth of conduit 54 which communicates with the cavity.

Of course, other arrangements of the zone and chamber portions are suitable as long as at least part of the portion of the chamber to which steam is supplied occupies at least part of the microwave resonant zone.

Also embedded within the ceramic plug 46 are microwave radiators 60. The orientation of these radiators is such that microwave radiation 64 is projected into the portion of the coal bed 44 in the resonant zone-cavity 48. In this embodiment the faces of radiators 60 are flush with the vertical wall of the cavity 48 and are not covered by reflective metal layer 49, but, rather, a ceramic barrier material 51 transparent to microwave energy but suitable to withstand the forces of the coal bed 44. Microwave radiation is supplied to radiators 60 through waveguides 58 which are also implanted within ceramic plug 46 and extend outwardly beyond the walls of reactor 40 to microwave energy sources such as magnetrons 61. In this embodiment the waveguides are coaxial and are two-inch diameter tubes constructed from cast iron.

In operation, steam 62 issues from nozzles 52 and countercurrently contacts coal of bed 44 as it infiltrates through interstices in the coal bed, first in cavity 48, and then beyond in the balance of chamber 42. The steam 62 is superheated and of a temperature of about 972° C. (1800° F.). Sensible heat is imparted by the steam to the coal, most intensely in cavity 48 just after steam 62 issues from nozzles 52. Microwave radiation 64 is continuously emitted by radiators 60 and contacts the product of the contacting of superheated steam and coal. Irradiation with microwave energy is sufficient to effect conversion of carbon in the coal to water gas. The gaseous product rises through the coal bed and is taken off at conduit 66. Residual ash left over from the reaction of carbon in the coal with the steam is removed from the reaction chamber 42 via conduit 54, through which the ash travels to ash lock 56 for disposal.

In FIG. 5 there is shown a waveguide gasification apparatus which is also suitable for practicing the invention. The reactor 70 is a substantially cylindrical tube and of material which is not transparent to microwave radiation, such as carbon steel. This reactor tube functions as a waveguide; the need to penetrate a reactor vessel with microwave radiation is eliminated. Conduit 76, of smaller diameter than reactor 70, is substantially coaxial with, and projects downwardly into the space defined within, the reactor; conduit 82, also of lesser diameter than reactor 70, is substantially coaxial with, and projects upwardly into the space within, the reactor. Conduits 76 and 82 interface at barrier 88 which prevents communication therebetween. Below the interface, units 90 are supported on the inner walls of cylinder 70 and extend across the chamber therein; each of these units comprises an aggregate of dielectric beads held together by suitable means. These units are spaced from each other and are disc-like in shape. Conduit 82 passes through all of units 90. These units are incorporated in the apparatus to aid in impedance matching, as further explained below. However, it is noted that in some embodiments the invention is practiced without such units.

In the space above uppermost unit 90, conduit 76 and the uppermost portion of conduit 82, along with the inner surface of the upper portion of reactor 70, bound an annular chamber 72 in which bituminous coal forms a bed 74. There are interstices 75 within the bed. Just above the barrier 88 between conduits 76 and 82, conduit 76 is provided with ports 78. Superheated steam 92 (from a steam generator not shown for purposes of simplicity) of a temperature of about 972° C. (1800° F.) passes down conduit 76 and through ports 78 and countercurrently contacts coal of bed 74, infiltrating through its interstices. Ports 78 are protected by shield 80 (shown in phantom) to prevent their clogging.

Means for irradiating and emitting microwave energy are operatively associated with reactor 70. Accordingly, beams of microwave radiation 94 generated with a magnetron at an end of the reactor (magnetron not shown for purposes of simplicity) and then emitted pass upwardly through units 90 to irradiate the product of contacting of steam 92 and coal of bed 74. Units 90, which are interposed between the microwave source and the coal bed 74, provide for a smooth transition from the impedance of free space to that of the coal bed, thereby minimizing waste of microwave energy.

When the product of the contacting of steam and coal is irradiated by beams 94, water gas is produced. This product gas travels upwardly through the interstices 75 of coal bed 74 and is taken off. Ash 96, the residual product of the gasification, is disposed of by being taken off at ports 84, thereafter traveling down conduit 82 to a suitable receptacle. Ports 84 are also protected by shield 86 (shown in phantom) to prevent their clogging.

It will be appreciated that shields 80 and 86 are constructed of microwave-reflective material and, therefore, prevent microwave energy from flowing into ports 78 and 84. This minimizes, or eliminates, arcing and distortion of the microwave field and aids in attaining an impedance match as microwave energy enters the coal bed.

The product of gasification in accordance with the claimed invention is used in the same manner as the products of conventional gasification are used, i.e., directly as a source of energy (fuel), or as an intermediate raw material in the synthesis of other liquid and gaseous fuels or of industrial chemicals. Some of the important synthesis products are synthetic pipeline gas (methane), hydrogen, ammonia, alcohols, olefins and distillable oils. The invention is useful in providing an alternative to the use of natural gas as a fuel source; this is significant in view of limited reserves of natural gas. Furthermore, the invention is useful in the production of a sulfur-free gas from coal capable of replacing raw coal as a boiler fuel, thereby abating atmospheric pollution by sulfur oxides.

Thus, the invention provides a highly efficient and energy conservative method and apparatus for the gasification of solid carbonaceous materials by irradiation with microwave energy of the product of the contacting of a solid carbonaceous material with steam, thereby taking advantage of the selective microwave enhancement of the gasification reaction.

The terms and expressions which have been employed are used as terms of description and not of limitation, and there is no intention in the use of such terms and expressions of excluding any equivalents of the features described, or portions thereof, it being recognized that various modifications are possible within the scope of the invention.

What is claimed is:

1. A method for gasifying carbon of solid carbonaceous material to produce carbon monoxide and hydrogen, which comprises providing a bed of solid carbonaceous material with interstices in the bed, infiltrating superheated steam through said interstices thereby contacting said solid carbonaceous material with said superheated steam, and during said infiltration irradiating the contact product of said solid carbonaceous material and superheated steam with an amount of microwave energy sufficient to effect gasification of the carbon.

2. A method as defined in claim 1, wherein the solid carbonaceous material is coal, the superheated steam is of temperature in a range of from 815° C. to 1370° C., and irradiation is carried out with pulsed microwave energy.

3. A method as defined in claim 1, which further comprises irradiating with pulsed microwave energy.

4. A method as defined in claim 1, wherein said steam is of temperature in a range of from 700° C. to 5000° C.

5. A method of gasifying carbon in solid carbonaceous material to produce carbon monoxide and hydrogen, which comprises providing a bed of said solid carbonaceous material with interstices in the bed, countercurrently infiltrating superheated steam along with carbon monoxide and hydrogen produced by said gasification through the interstices in the bed, and in so doing imparting heat from the excess steam, carbon monoxide and hydrogen to said solid carbonaceous material in a zone of the bed most remote from the location of introduction of said superheated steam into the bed thereby driving off moisture from the solid carbonaceous material, in a less remote zone of the bed imparting heat from excess superheated steam, carbon monoxide and hydrogen to the moisture-poor solid carbonaceous material to drive off distillates from said material, and in a still less remote zone of the bed imparting heat from excess steam, carbon monoxide and hydrogen to said distillate-poor solid carbonaceous material to convert the carbon in said material to coke, contacting said coke with superheated steam, and irradiating the product of said contacting in a portion of the bed proximate the location of introduction of the superheated steam into said bed with an amount of microwave energy sufficient to effect gasification of the carbon.

6. A method as defined in claim 5, which further comprises irradiating with pulsed microwave energy.

7. A method as defined in claim 6, wherein said solid carbonaceous material is coal, and wherein the gasification occurs in the absence of heat generated by the oxidation of said coal.

8. A method as defined in claim 7, which further comprises irradiating only a portion of the product of the infiltration of superheated steam through the coal.

9. A method as defined in claim 7, wherein the amount of superheated steam is of from two to two and one-half times the stoichiometric amount thereof with reference to the amount of fixed carbon.

* * * * *